UNITED STATES PATENT OFFICE.

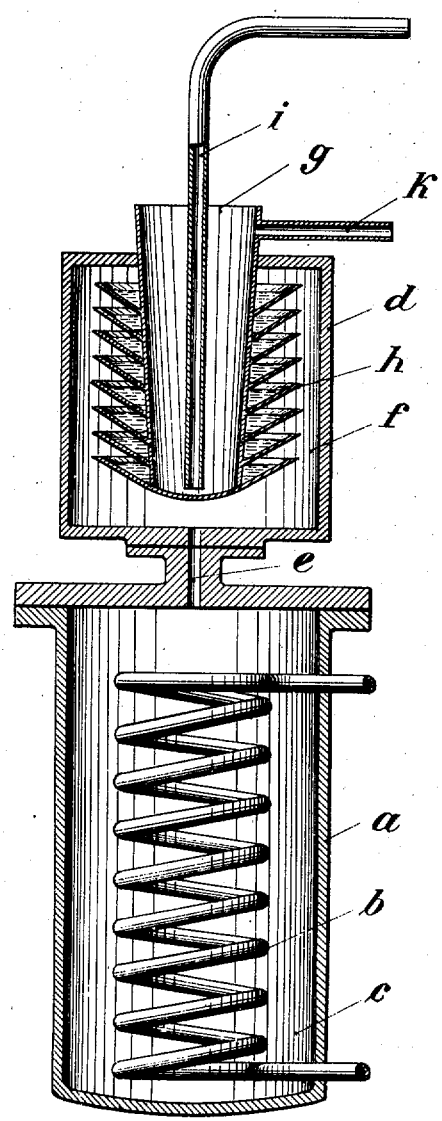

CARL SENSSENBRENNER, OF DUSSELDORF-OBERKASSEL, GERMANY.

COMBINED CONDENSING AND EVAPORATING APPARATUS FOR ICE-MAKING MACHINES.

1,017,695.
Specification of Letters Patent.
Patented Feb. 20, 1912.

Application filed October 5, 1909. Serial No. 521,154.

*To all whom it may concern:*

Be it known that I, CARL SENSSENBRENNER, manufacturer, a subject of the King of Prussia, residing at No. 73 Arminiusstrasse, Dusseldorf-Oberkassel, Germany, have invented new and useful Improvements in Combined Condensing and Evaporating Apparatus for Ice-Making Machines, of which the following is a specification.

In small ice-making machines, as is well known, two vessels are employed for recovering the ammonia. The latter is firstly separated from its solution in a distilling-vessel, with the aid of heat and pressure, and is subsequently liquefied again by cooling.

The subject of the present invention is an apparatus by means of which both the liquefaction and the evaporation of the ammonia are essentially accelerated. This is effected by the provision in the condenser of a cooling-vessel, which is furnished externally with annular cooling-ribs, directed upwardly in inclined direction. These ribs constitute cups or trays, as it were, to catch up the liquid ammonia which is deposited in the cooler.

A practical embodiment of the invention is illustrated in the accompanying drawing, in which the figure is a vertical section.

In the evaporator $a$, to which the ammonia solution is supplied, there is located a heating-coil $b$, and the chamber $c$ of the evaporator communicates with the chamber $f$ of the superimposed condenser $d$ by means of a passage $e$, conducting through the cover of the evaporator $a$ and bottom of the condenser $d$. In the condenser there is tightly fitted a vessel $g$, whose outer wall, within the chamber $f$, is furnished with upwardly inclined annular ribs $h$, constituting cups or trays for the ammonia deposited on a cooling-agent being conducted into the vessel $g$. $i$ is a water supply-pipe and $k$ an overflow-pipe for the vessel $g$.

When the apparatus is set in operation, a strongly saturated ammonia solution is contained in the evaporator $a$. Steam is then conducted through the worm $b$, whereby this solution is heated, and the ammonia which is thus liberated escapes through the passage $e$ into the chamber $f$ of the condenser $d$, where it comes in contact with the cooler $g$, and its ribs $h$. If, now, cooling-water is allowed to enter the vessel $g$, through the pipe $i$; this vessel $g$, together with the ribs $h$, will assume the temperature of this cooling-water. This will result in ammonia in liquid form being deposited from the gas on the outside of the vessel $g$, which ammonia will collect in the cups or trays $h$.

When the distillation and condensation of the ammonia is completed, the inlet-pipe $i$ for the cooling-water is removed, and after the supply of steam has been cut off, cooling-water is conducted into the worm $b$. In consequence of the partial vacuum now arising in the chamber $c$ of the evaporator $a$, and owing to the absorption of heat from the condenser $d$, the ammonia which has collected in the trays $h$ is evaporated again. The consequent reduction of temperature which occurs is shared directly by the ribs and the wall of the vessel $g$, and by the water contained in the latter. On fresh-water being supplied to the vessel $g$, therefore, it will at once freeze. After removal of the block of ice, the procedure above described can be commenced anew.

Having thus described my invention, I declare that what I claim is:—

In an ice-making machine the combination of two vessels one placed above the other, the lower vessel communicating with the bottom portion of the upper vessel and with a receptacle disposed in one of said vessels, annular upwardly-extending conical ribs projecting from the outer side of this receptacle, and means for alternately heating and cooling the other vessel, substantially as set forth.

Signed at Barmen, Germany, this 21st day of September, 1909, in the presence of two witnesses.

CARL SENSSENBRENNER. [L. S.]

Witnesses:
GUSTAV KILTZ,
CARL HAUSER.